United States Patent [19]
Ostwald

[11] 3,779,579
[45] Dec. 18, 1973

[54] WHEEL MOUNTING ASSEMBLY

[75] Inventor: Richard Ostwald, Bowling Green, Ky.

[73] Assignee: Gordon Smith & Co., Inc., Bowling Green, Ky.

[22] Filed: July 7, 1972

[21] Appl. No.: 269,665

[52] U.S. Cl. .............................. 280/150.5, 280/475
[51] Int. Cl. ............................................. B60s 9/02
[58] Field of Search ........................ 280/475, 150.5

[56] References Cited
UNITED STATES PATENTS
| | | | |
|---|---|---|---|
| 2,981,552 | 4/1961 | Rutigliano | 280/150.5 |
| 3,150,884 | 9/1964 | Drott | 280/475 X |
| 3,175,710 | 3/1965 | Kistner | 214/84 |

FOREIGN PATENTS OR APPLICATIONS
| | | | |
|---|---|---|---|
| 497,338 | 12/1938 | Great Britain | 280/150.5 |

*Primary Examiner*—Leo Friaglia
*Attorney*—Francis C. Browne et al.

[57] ABSTRACT

For a vehicle such as an air compressor frame, a wheel mounting assembly including a fixed shaft secured to the vehicle frame by mounting bolts which pass transversely through the fixed shaft and into portions of the vehicle frame. Mounted on the fixed shaft for rotation about the horizontal axis thereof is a movable shaft in the form of a sleeve which has fixed thereto and projecting normally therefrom an arm to which a swivel wheel is mounted to be movable with the arm and movable shaft about the fixed shaft. Fixed to the arm is a handle for moving the wheel assembly about the fixed shaft between a lower or extended position wherein the wheel engages the ground surface and an upper or retracted position wherein the wheel is spaced from the ground surface. A latch is mounted on the handle to releasably lock the wheel assembly in both positions. The latch assembly includes a latch pin mounted in the movable shaft for movement into and out of locking slots radially formed in the fixed shaft. Actuation of the latch pin is by a hand grip pivoted to the main handle and connected to the latch pin by a rod extending along the main handle. The mounting bolts which secure the fixed shaft to the frame are made from material such that should the wheel assembly receive an excessive force such as for example when the wheel assembly is inadvertently left in the lowered position while the compressor frame is being towed, the mounting bolts will shear or rupture to minimize damage to the wheel assembly.

15 Claims, 5 Drawing Figures

PATENTED DEC 18 1973　　　　　3,779,579

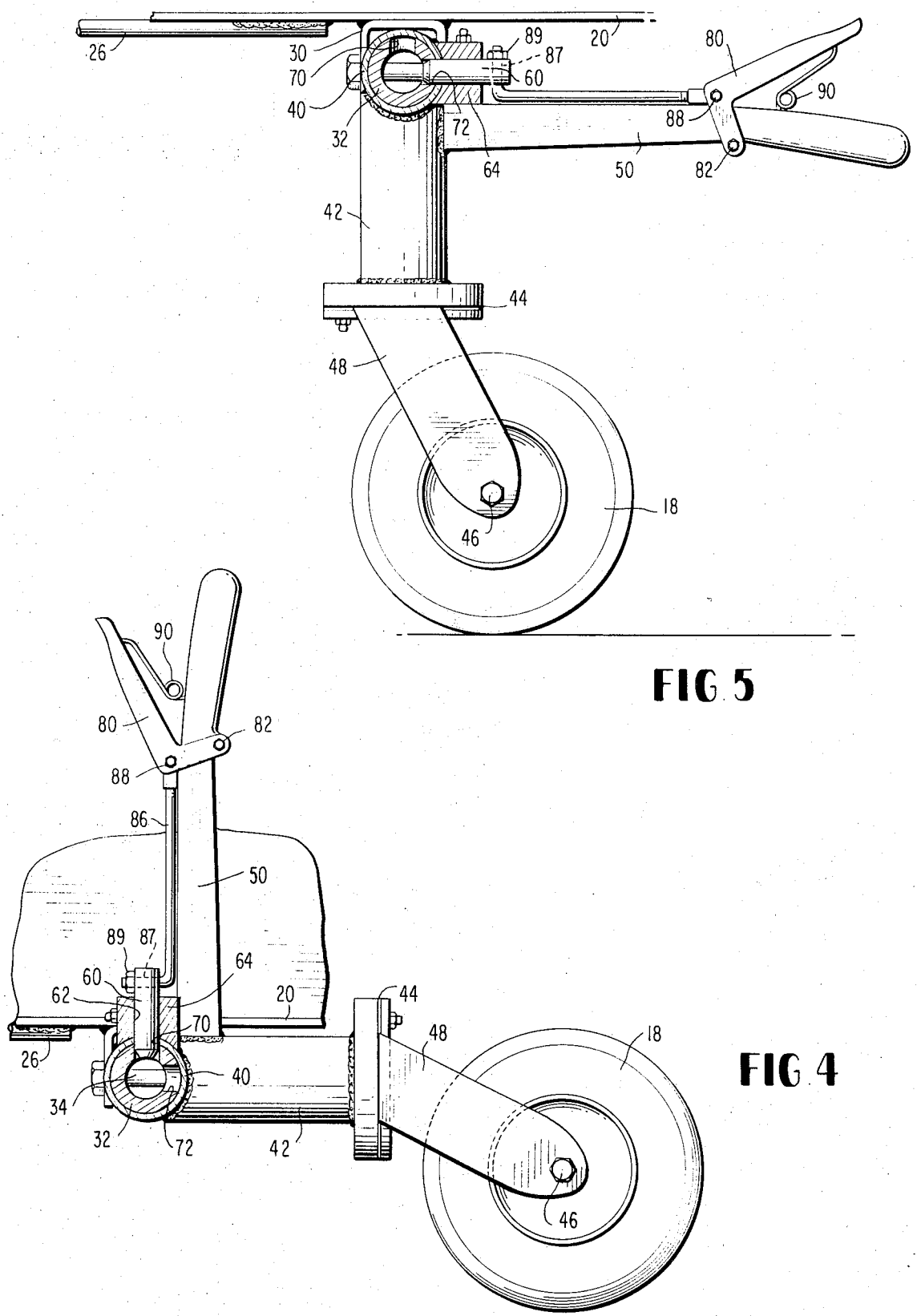

WHEEL MOUNTING ASSEMBLY

BACKGROUND OF INVENTION

In certain vehicles such as air compressors which are adapted to be towed to various locations of use or storage, it is desirable to incorporate a swivel wheel assembly in the front thereof to be lowered when the compressor is in use and to be raised during towing or other transportation of the air compressor. With conventional vehicles and those of the prior art, such swivel wheels are mounted such that in order to raise or lower them, the wheel assembly itself must be grasped by hand and moved into position, held there while a lock or latch pin is operated to hold the wheel assembly in the desired position. Because of the weight of the wheel assembly as well as the fact that the wheel is mounted for swivel movement relative to its mounting arm or shaft, manipulation and locking of the wheel assembly according to prior art devices and methods is a dangerous task which often has resulted in injury to personnel.

Another problem which has existed is that should the wheel assembly be inadvertently in its lower position while the frame is being towed, the wheel assembly becomes susceptible to various forces which if excessive could result in damage to the wheel assembly.

OBJECTS OF INVENTION

The present invention relates to a novel mounting for a wheel assembly particularly suitable for a vehicle such as used for supporting a portable air compressor which may be towed however the present invention need not be limited to the latter.

One of the objects of the present invention is to provide a novel mounting for a wheel assembly which will overcome the above noted problems to provide a simple and safe method for raising and lowering a wheel relative to an associated vehicle frame.

A further object of the present invention is to provide such a mounting for a wheel assembly which will avoid damage to the wheel assembly occasioned by forces applied thereto for example when the wheel assembly is inadvertently left in a lower ground engaging position during towing of the associated vehicle.

Another object of the present invention is to provide such a novel wheel mounting assembly which may be easily incorporated into standard or new vehicle frames including portable air compressor frames where it may be quickly and easily operated to raise or lower the wheel assembly relative to the associated vehicle frame.

A further object of the present invention is to provide such wheel mounting assembly which may be applied to a swivel type wheel to be mounted on a vehicle frame.

Yet another object of the present invention is to provide such a wheel mounting assembly that may be economically manufactured and applied to vehicle frames where it will provide dependable service over long periods of repeated and rugged use.

SUMMARY OF INVENTION

The above and other objects are achieved in one particular embodiment of a wheel mounting assembly for a portable air compressor including a frame supported on a dual wheel and axle assembly and having a draw bar projecting forwardly from the front end to be hitched to another vehicle for towing. In this specific embodiment, the mounting assembly includes a fixed shaft secured by mounting bolts passing transversely through the fixed shaft into a bracket fixed to the underside of the draw bar so that the fixed shaft extends in a horizontal plane transversely of the frame. Mounted for rotation about the fixed shaft is a movable shaft in the form of a hollow cylindrical sleeve having projecting normally therefrom an arm in the form of a tubular shaft. A wheel is fixed to the arm for angular movement therewith about the fixed shaft and also for swivel movement about the longitudinal axis of the arm by means of a suitable swivel assembly. Rotation of the arm and movable shaft about the fixed shaft will either raise or lower the wheel relative to the ground surface depending on the direction of movement. Manipulation of the wheel assembly to move it between retracted or extended positions is achieved through a main handle fixed to the arm and projecting outwardly from the arm to be gripped by the operator.

To releasably lock the wheel assembly in either of its raised or lowered positions there is provided a latch assembly including a lock pin mounted in a hub projecting normally from the movable sleeve. The fixed shaft is formed with two radially extending slots or passages spaced 90° from each other for receiving the lock pin to lock the wheel assembly relative to the fixed shaft in either its raised or lowered position. Actuation of the lock pin is achieved through a hand grip pivoted to the main handle and connected to the lock pin by means of an elongated rod extending along the main handle.

When the compressor is in use, the swivel wheel is in the lower or extended position engaging the ground surface and is locked in this position by means of the lock pin received in one of the slots in the fixed shaft. After use, for example when it is desired to hitch the compressor to a vehicle for towing, the operator merely grasps the handle and squeezes the associated hand grip for moving the lock pin out of the fixed shaft thereby releasing the wheel assembly for movement about the fixed shaft. The operator may then merely move the main handle to pivot the wheel assembly about the fixed shaft into the upper retracted position spaced from the ground surface.

A safety feature is provided to guard against damage to the swivel wheel should the operator forget to retract the swivel wheel prior to towing. This feature entails using mounting bolts of a predetermined limited strength to secure the fixed shaft to the frame so that if for example the compressor is being towed with the swivel wheel in the extended position and the wheel receives a shock or other forces as a result, the mounting bolts will shear or rupture upon excessive application of force to prevent damage to the wheel assembly.

DRAWINGS

Other objects and advantages of the present invention will become apparent from the following detailed description taken in conjunction with the attached drawings in which:

FIG. 4 is a fragmental cross-sectional view taken generally along lines 4—4 of FIG. 2; and FIG. 5 is a view similar to FIG. 4 but showing the wheel assembly in a lower or extended position.

DETAILED DESCRIPTION

Figure 1:
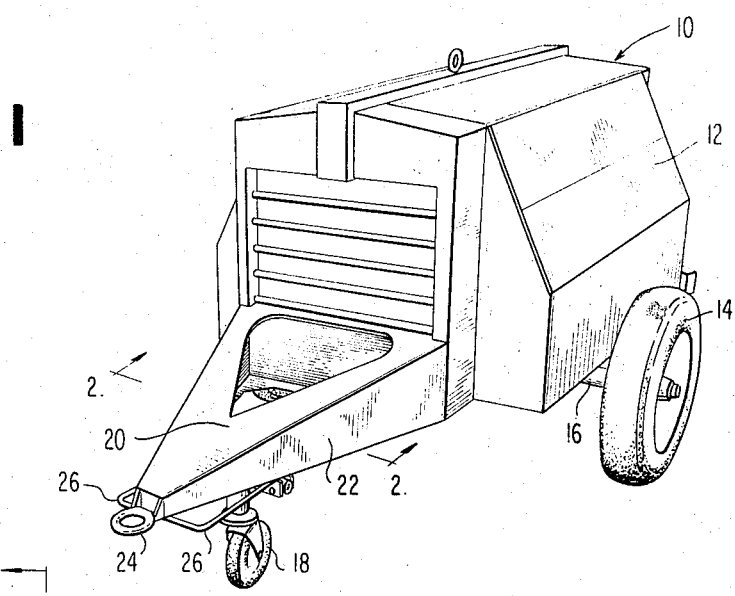
FIG. 1 is a perspective view of a portable air compressor having a front wheel assembly mounted in accordance with the present invention.

Referring now to the drawings in detail, there is shown in FIG. 1 for illustrative purposes only a portable air compressor 10 including a housing 12 enclosing an air compressor and engine (not shown) mounted on a frame supported conventionally by a pair of wheels 14 mounted on an axle 16 for movement over the ground surface. When in use, the air compressor frame is further supported by a front swivel wheel 18 mounted by an assembly embodying the invention to a draw bar 20 which extends forwardly as part of the frame. Draw bar 20 includes two side portions 22 which merge at an eye 24 used for hitching the air compressor to a vehicle to be towed. A pair of handles 26 are attached to the forward end of draw bar 20 for handling the air compressor during attachment and release relative to the towing vehicle (not shown).

Figure 3:
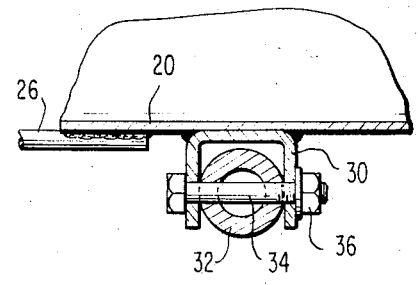
FIG. 3 is a fragmental cross-sectional view taken along lines 3—3 of FIG. 2.

In the shown embodiment, the front wheel mounting assembly includes a U-shaped steel brackets 30 fixed in spaced relationship across the underside of draw bar 20 such as by welding for example. Fixed in brackets 30 in a horizontal plane in the general transverse direction of draw bar 20 is a fixed cylindrical shaft 32 shown as being hollow. Shaft 32 is fixed in brackets 30 by threaded mounting bolts 34 extending diametrically through fixed shaft 32 and the legs of brackets 30 with nuts 36 on the threaded extremities of the mounting bolts as shown in FIG. 3. For purposes which will become apparent subsequently, mounting bolts 34 are designed to have a predetermined limited strength to shear or rupture should the wheel 18 be subjected to excessive forces or shocks when it is extended into engagement on the ground surface.

Mounted for rotation about fixed shaft 32 is a movable shaft in the form of a hollow cylindrical sleeve 40. Projecting centrally and perpendicularly from movable shaft 40 is an arm in the form of a hollow steel shaft 42 to which wheel 18 is mounted by any suitable or conventional swivel assembly generally designated 44. Wheel 18 is mounted on an axle 46 suitably secured in spaced legs 48 connected to the lower portion of the swivel assembly 44 so that wheel 18 is free to swivel about the longitudinal axis of arm 42. Wheel 18 together with arm 42 and movable shaft 40 are rotatable about the horizontal axis of the fixed shaft 32. In this way wheel 18 may be raised or lowered relative to the ground surface. In the lower or extended position of wheel 18 wherein it engages the ground surface as shown in FIG. 5 the frame may be firmly supported on the ground surface to permit the air compressor to be operated. During transport or movement of the air compressor when not in use, wheel 18 is retracted into the raised position shown in FIG. 4.

Manipulation of wheel 18 to move it between its extended and retracted positions is achieved by means of a handle 50 fixed to arm 42 adjacent shafts 32 and 40 and projecting from arm 42 at right angles to be grasped by an operator. By manipulating handle 50 and moving it in the clockwise direction (as viewed in FIG. 4), arm 42 and sleeve 40 may be rotated about fixed shaft 32 to lower wheel 18 into the extended position engaging the ground surface. In this position as shown in FIG. 5, handle 50 extends below draw bar 20 in a generally horizontal plane.

Figure 2:
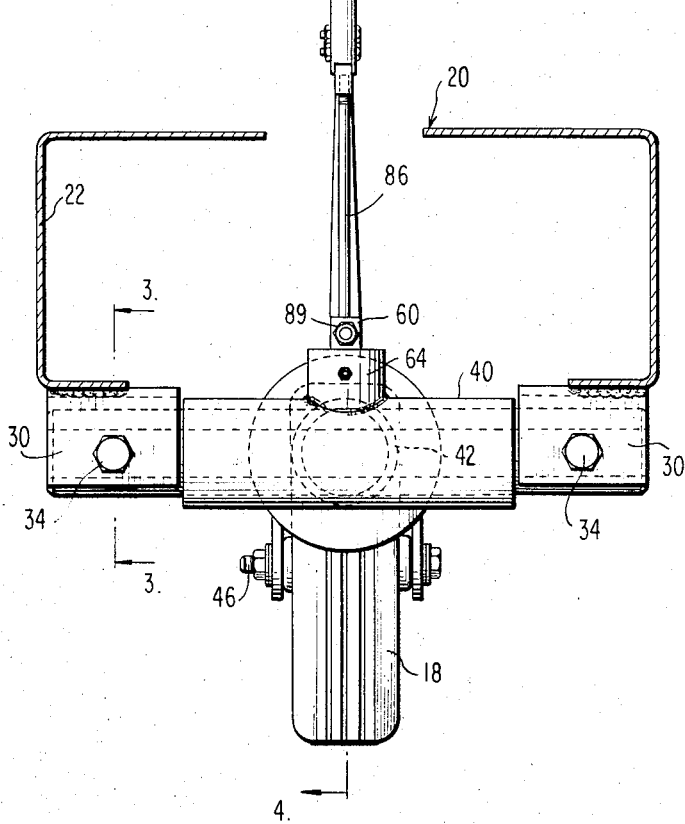
FIG. 2 is a cross-sectional view taken generally along lines 2—2 of FIG. 1 but with the wheel assembly in raised or retracted position.

Rotation of the handle in the counter clockwise direction (as viewed in FIG. 5) will of course raise wheel 18 away from the ground surface into the retracted position as shown in FIG. 4, wherein arm 42 extends generally in a horizontal plane, with handle 50 extending vertically upwardly through draw bar 20 as shown in FIGS. 2 and 4.

In order to positively retain wheel 18 in either of its raised or lowered positions, a lock mechanism is provided in the form of a latch including a lock pin 60 mounted for longitudinal slidable movement in a passage 62 of a hub 64 projecting radially outwardly from one side of movable shaft 40 at a spacing of 90° from arm 42 as shown in the drawings. Fixed shaft 32 is provided with two radial holes or passages 70 and 72 spaced 90° from each other for alternately receiving lock pin 60 when wheel 18 is either in its extended or retracted position. In the retracted position of wheel 18 as shown in FIG. 4, lock pin 60 is received in slot 70 and in the extended or lowered position of wheel 18 lock pin 60 is received in slot 72.

Actuation of lock pin 60 into and out of slots 70 and 72 of fixed shaft 32 is achieved through an auxiliary handle in the form of a hand grip 80 shown as an L shaped crank pivot at one of its extremities by pin 82 to the main handle 50 as shown in FIGS. 4 and 5. Hand grip 80 is connected to lock pin 60 to actuate the same upon pivotal movement about pin 82 by means of a connecting rod 86. One end of connecting rod 86 is pivotally connected by pin 88 to hand grip 80 at the bight portion thereof while the other end 87 of connection rod 86 projects outwardly at right angles and is recieved in a transverse passage in lock pin 60. A nut 89 is screwed on the extremity 87 of connecting rod 86 to secure rod 86 to lock pin 60. Upon longitudinal movement of connecting rod 86, lock pin 60 will be moved axially in hub 64 for movement into or out of slots 70 and 72 in fixed shaft 32.

In the embodiment shown, lock pin 60 is biased into an extended latching position towards fixed shaft 32 by means of a spring 90 interposed between hand grip 80 and main handle 50 as shown in FIGS. 4 and 5. It will thus be seen that depression of hand grip 80 will be against the bias of spring 80 and will retract locking pin from slot 70 or 72 in fixed shaft 32, thereby releasing shaft 40 for movement about shaft 32.

Release of the hand grip 80 will permit spring 90 to become effective to pivot hand grip 80 in a counter-clockwise direction (as viewed in FIG. 4) about pivot 82 to extend connecting rod 86 and the lock pin 60 towards fixed shaft for receipt in either slot 70 or 72.

From the above it will be seen that in order to ready the air compressor for use, main handle 50 may be grasped by the operator and the hand grip 70 depressed to retract lock pin 60 and thereby permit wheel 18 to be pivoted downwardly about fixed shaft 32 to engage the ground surface whereby the frame is supported by three wheels relative to the ground surface. Upon release of hand grip 80, lock pin 60 will move into slot 72 to lock wheel 18 in the lowered position. After use of the air compressor when it is desired to transport the same to another location or for storage purposes, the operator merely grasps main handle 50 and hand grip 80 and depresses the latter to withdraw locking pin 60 from the slot 72 in the fixed shaft, whereby handle 50 may be rotated in the counterclockwise direction to pivot wheel 18 upwardly into the retracted position. Release of hand grip 80 will permit spring 90 to move connecting rod 86 and pin 60 downwardly to engage pin 60 in hole 72 to positively lock wheel 18 in the retracted position.

In the event the operator neglects to raise the wheel 18 into the retracted position prior to transportation of the vehicle frame, a safety feature will be effective to prevent permanent damage to the swivel wheel assembly. This safety feature as noted above involves use of the mounting bolts 34 which are made from material or otherwise made to have less strength in resisting shocks than the front wheel assembly. Should wheel 18 be in its extended position during transportation of the vehicle frame and an excessive force is applied to the wheel from bumps on the road or otherwise, mounting bolts 34 will shear or rupture upon the application of a predetermined amount of force to avoid injury to the swivel wheel assembly including arm 42 and shafts 32 and 40 and lock pin 60. In the preferred embodiment, the locking pin 60 has a shear limit of approximately 53,000 psi; and the mounting bolts 34 are designed to shear at 32,000 psi to avoid shearing of the lock pin 60. In this embodiment, lock pin 60 is made from stainless steel with a ¾ inch diameter, the stainless steel materal having a shear strength of 120,000 psi. The mounting bolts 34 each are made from ½ inch diameter mild steel having a shear strength of 40,000 psi.

I claim:

1. In combination with a frame including a wheel for supporting the frame from a ground surface, means mounting the wheel to the frame for movement between a raised position spaced above the ground surface and a lowered position depending below the frame to engage the ground surface, said means comprising; a fixed shaft secured in stationary position to the frame in a generally horizontal plane, an arm having the wheel mounted thereon, a hollow shaft having the arm fixed thereto and being received about the fixed shaft for rotation about the fixed shaft, a handle projecting from one of said hollow shaft and arm to be grasped by an operator for moving the wheel about the fixed shaft between said raised and lowered positions, and latch means for releasably locking the wheel in said position, said handle including a hand grip mounted thereon and connected to said latch means to release the same for permitting the wheel to be moved relative to said shaft.

2. The combination defined in claim 1 wherein said latch means includes a pair of holes extending radially into the fixed shaft at angularly spaced locations, a lock pin receivable in said holes, and a connecting rod interconnecting said hand grip and said lock pin such that the lock pin may be actuated by the hand grip into or out of said holes.

3. The combination defined in claim 2 including spring means biasing said locking pin in a direction to be engaged in said holes.

4. The combination defined in claim 1 wherein there is further included mounting bolts extending transversely through said fixed shaft and through portions of said frame for securing the fixed shaft to the frame, said mounting bolts having a predetermined limited strength such that they will shear upon excessive application of forces prior to bending or permanent deformation of said arm and shafts.

5. An assembly for mounting a wheel to a vehicle frame, the assembly comprising in combination; a fixed shaft adapted to be secured to a vehicle frame in fixed position, wheel mounting means mounted on said fixed shaft for rotation about the fixed shaft, handle means projecting from the wheel mounting means for moving the wheel mounting means about the fixed shaft, latch means for securing the wheel mounting means in two angularly spaced positions about the fixed shaft, and actuating means for releasing said latch means to permit movement of said wheel, said actuating means including a hand grip on said handle means connected to said latch means to actuate same.

6. The assembly defined in claim 5 wherein said latch means further includes a pair of holes radially formed in the fixed shaft at angularly spaced locations, a lock pin receivable in said holes, and wherein said actuating means includes a connecting rod interconnecting the hand grip and the lock pin.

7. The assembly defined in claim 6 further including spring means biasing said lock pin towards engagement in said slots.

8. The assembly defined in claim 7 wherein said handle means projects generally at right angles from said wheel mounting means, and said wheel mounting means includes an arm projecting perpendicularly relative to said fixed shaft, and a sleeve received about said fixed shaft with the arm being fixed thereto.

9. The assembly defined in claim 8 further including a hub projecting from said movable sleeve, and having a passage therein receiving said lock pin.

10. The assembly defined in claim 9 wherein said wheel mounting means includes a swivel means for mounting the wheel for rotation about the longitudinal axis of said arm.

11. The assembly defined in claim 10 wherein said hand grip is pivoted to said handle means, and said connecting rod extends generally parallel to said handle means.

12. In combination with a frame including a wheel for supporting the frame from a ground surface, means mounting the wheel to the frame for movement between a raised position spaced above the ground surface and a lowered position depending below the frame to engage the ground surface, said means comprising; a fixed shaft secured in stationary position to the frame, a number of mounting bolts extending transversely through said fixed shaft and through portions of said frame for securing the fixed shaft to the frame, said mounting bolts having a predetermined limited strength such that they will shear upon excessive application of forces prior to bending or permanent deformation of said shaft.

13. A combination defined in claim 12 wherein said means further includes a hollow shaft having the wheel mounted thereon, said hollow shaft being received about the fixed shaft for rotation about the fixed shaft, and latch means including a lock pin engageable in said fixed and hollow shafts to lock the wheel in position, and wherein said mounting bolts have a shearing strength less than said lock pin so that the mounting bolts will shear before said lock pin to avoid damage to the latter should it be subjected to excessive forces.

14. The combination defined in claim 13 wherein said lock pin has a shearing strength of approximately 53,000 pounds per square inch.

15. The combination defined in claim 14 wherein said mounting bolts have a shearing strength of approximately 32,000 pounds per square inch.

* * * * *